(12) United States Patent
Moradnia et al.

(10) Patent No.: US 11,753,082 B2
(45) Date of Patent: Sep. 12, 2023

(54) WHEEL CASING FOR VEHICLE

(71) Applicant: Honda Motor Co., Ltd., Tokyo (JP)

(72) Inventors: Pirooz Moradnia, Dublin, OH (US); Matthew L. Metka, Plain City, OH (US); Pratap Thamanna Rao, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/372,969

(22) Filed: Jul. 12, 2021

(65) Prior Publication Data
US 2023/0007846 A1   Jan. 12, 2023

(51) Int. Cl.
*B62D 25/18* (2006.01)
*B62D 25/16* (2006.01)

(52) U.S. Cl.
CPC ......... *B62D 25/186* (2013.01); *B62D 25/163* (2013.01)

(58) Field of Classification Search
CPC .... B62D 25/18; B62D 25/182; B62D 25/186; B62D 25/16; B62D 25/163; B62D 35/008; B60B 7/00
USPC ......................................... 280/849, 157, 847
See application file for complete search history.

(56) References Cited

U.S. PATENT DOCUMENTS

| | | | | | |
|---|---|---|---|---|---|
| 980,051 | A * | 12/1910 | Blaszczyk | ............ | B62D 25/186 280/157 |
| 1,454,738 | A * | 5/1923 | Hilton | .................. | B62D 25/186 280/847 |
| 1,613,443 | A * | 1/1927 | D Amato | ............. | B62D 25/186 280/157 |
| 2,352,464 | A * | 6/1944 | Clarence | .............. | B62D 25/186 280/160 |
| 2,401,683 | A * | 6/1946 | Richard | ............... | B62D 63/061 280/847 |
| 2,774,610 | A * | 12/1956 | Ratcliffe | .............. | B62D 25/168 280/847 |
| 4,362,310 | A * | 12/1982 | Goodall | ............... | B62D 25/188 280/157 |
| 5,074,573 | A * | 12/1991 | Dick | .................... | B62D 25/186 280/847 |

(Continued)

FOREIGN PATENT DOCUMENTS

| CN | 105774445 B | 3/2019 |
|---|---|---|
| CN | 107031738 B | 6/2019 |

(Continued)

OTHER PUBLICATIONS

Moe, Christian, 2015 Chevrolet Chaparral 2X VGT Concept, Nov. 20, 2014 [online], [retrieved on Aug. 24, 2021], Retrieved from the Internet <URL: https://www.topspeed.com/cars/chevrolet/2015-chevrolet-chaparral-2x-vgt-concept-ar166232.html>.

*Primary Examiner* — Emma K Frick
(74) *Attorney, Agent, or Firm* — Plumsea Law Group, LLC (57) ABSTRACT

A wheel casing including a body portion configured to be positioned along an inboard sidewall of a tire having an axis of rotation and at least a front strake positionable over tread of the tire. The front strake having a first edge adjacent the body portion and extending outwardly to a second edge of the front strake that terminates at or inboard of an outboard side of the tire, the front strake defining a lower edge and an upper edge, the lower edge and the upper edge both configured to be positioned forward of the axis of rotation, and tread of the tire positioned rearward of the upper edge is uncovered by the wheel casing.

19 Claims, 7 Drawing Sheets

(56) References Cited

U.S. PATENT DOCUMENTS

| | | | |
|---|---|---|---|
| 5,836,399 A | 11/1998 | Maiwald et al. | |
| 5,951,123 A * | 9/1999 | Bomstad | E02D 3/026 |
| | | | 172/112 |
| 6,007,102 A | 12/1999 | Helmus | |
| 6,109,621 A * | 8/2000 | Hettich | B62D 25/186 |
| | | | 280/157 |
| 6,944,949 B2 * | 9/2005 | Banry | B29C 45/14336 |
| | | | 280/847 |
| 8,066,304 B2 * | 11/2011 | Ulgen | B62D 25/182 |
| | | | 280/847 |
| 8,146,987 B2 * | 4/2012 | Uchino | B62D 25/161 |
| | | | 296/198 |
| 8,424,956 B2 | 4/2013 | Stimel | |
| 8,979,102 B1 * | 3/2015 | Prentice | B62D 25/186 |
| | | | 280/124.1 |
| 9,027,983 B2 * | 5/2015 | Butler | B62D 35/001 |
| | | | 280/847 |
| 9,327,550 B2 | 5/2016 | Butler et al. | |
| 9,545,955 B2 * | 1/2017 | Xu | B62D 65/02 |
| 9,694,857 B2 | 7/2017 | Rudwal et al. | |
| 10,266,206 B2 * | 4/2019 | Gallier | B62D 29/005 |
| 10,494,033 B2 | 12/2019 | Haeseker et al. | |
| 10,633,034 B2 * | 4/2020 | Miwa | B60K 11/08 |
| 10,787,205 B2 * | 9/2020 | Driant | B62D 25/16 |
| 10,919,575 B1 * | 2/2021 | Sardes | B62D 27/02 |
| 11,260,920 B2 * | 3/2022 | Bender | B62D 25/188 |
| 11,377,156 B2 * | 7/2022 | Esber | B62D 25/18 |
| 2007/0182151 A1 * | 8/2007 | Aulabaugh | B62D 25/161 |
| | | | 280/849 |
| 2011/0080019 A1 * | 4/2011 | Castillo | B62D 25/16 |
| | | | 296/180.1 |
| 2011/0304129 A1 | 12/2011 | Owens | |
| 2012/0013113 A1 | 1/2012 | Trenne et al. | |
| 2013/0096781 A1 | 4/2013 | Reichenbach et al. | |
| 2018/0257716 A1 | 9/2018 | Haeseker et al. | |
| 2019/0270486 A1 | 9/2019 | Del Gaizo et al. | |
| 2019/0300069 A1 | 10/2019 | Angelo | |
| 2020/0114681 A1 | 4/2020 | Parry-Williams et al. | |
| 2022/0177043 A1 * | 6/2022 | Bowen | B62D 25/163 |

FOREIGN PATENT DOCUMENTS

| | | |
|---|---|---|
| CN | 209336470 U | 9/2019 |
| CN | 209956082 U | 1/2020 |
| CN | 211519673 U | 9/2020 |
| DE | 102016209085 A1 | 11/2017 |
| EP | 3405383 A1 | 11/2018 |
| FR | 2987804 B1 | 6/2015 |
| FR | 3044591 B1 | 10/2018 |
| RU | 2139806 C1 | 10/1999 |
| WO | 201624054 A1 | 2/2016 |

* cited by examiner

WHEEL CASING FOR VEHICLE

BACKGROUND

The present disclosure relates to a wheel casing for a vehicle tire.

When a vehicle is in motion, the pressure difference between the forward facing surfaces and the backward facing surfaces create a net rearward resultant force, often referred to as aerodynamic drag, which in turn reduces the aerodynamic performance of the vehicle. The wheel well or wheel opening of a vehicle is one source of drag force on the vehicle due to the open space defined between the vehicle wheel and the wheel well. That is, air flow within the wheel well contributes to vehicle drag as the vehicle moves across a road surface.

Wheel liners and wheel casings have been used to reduce the amount of space between the vehicle wheel and the wheel well and thereby reduce the volume of air flow within the wheel well that can contribute to vehicle drag. However, conventional wheel casings have been large shields generally applied to an exterior side of the vehicle and thus interfere with exterior styling of the vehicle. The large shields also add considerable weight to the overall vehicle and may interfere with other vehicle components.

SUMMARY

There is thus a need in the art for a casing system that improves the aerodynamic performance of a vehicle without detracting from the exterior appearance of the wheel assembly, and also limits the overall weight increase and eliminates interference with other vehicle components.

The wheel casing according to an exemplary embodiment of the disclosure herein serves to minimize the amount of high energy underbody air in contact with the wheel assembly, thereby reducing the amount of drag on the rotating tires and improving the aerodynamic performance of the vehicle. In addition, since the wheel casing does not extend to the exterior or outer side of the wheel assembly, it does not detract from the aesthetic appearance of the vehicle. That is, the outer side of the wheel assembly is completely visible, including the wheel and any type of decorative cap that may be applied.

In one aspect, the disclosure provides a wheel assembly for a vehicle including a wheel configured for rotation with respect to the vehicle and a tire configured to be mounted on the wheel, the tire having an inboard surface, an outboard surface, and a circumferential tread surface extending between the inboard surface and the outboard surface; and a wheel casing configured to be positioned beneath an axis of rotation of the wheel such that the wheel casing defines a body portion including a continuous length positioned beneath the axis of rotation, along the inboard surface of the tire, and extending between a first end disposed on one side of the axis of rotation to a second end disposed on an opposing side of the axis of rotation.

In another aspect, the disclosure provides a wheel casing comprising including a body portion configured to be positioned along an inboard sidewall of a tire having an axis of rotation; and at least a front strake positionable over tread of the tire, the front strake having a first edge adjacent the body portion and extending outwardly to a second edge of the front strake that terminates at or inboard of an outboard side of the tire, the front strake defining a lower edge and an upper edge; the lower edge and the upper edge both being positioned forward of the axis of rotation, and the tread of the tire positioned rearward of the upper edge being uncovered by the wheel casing.

A system and method according to an exemplary embodiment of the disclosure provides a wheel casing having a body including a continuous length positionable beneath an axis of rotation of a wheel assembly including a tire, the continuous length extending from a first end positioned along an inboard surface of the tire forward of the axis of rotation to a second end positioned along the inboard surface of the tire rearward of the axis of rotation; wherein a portion of the body positioned between the first and second ends is shaped to receive a suspension component during operation of the vehicle.

Other systems, methods, features and advantages of the disclosure will be, or will become, apparent to one of ordinary skill in the art upon examination of the following figures and detailed description. It is intended that all such additional systems, methods, features and advantages be included within this description and this summary, be within the scope of the disclosure, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles of the disclosure. Moreover, in the figures, like reference numerals designate corresponding parts throughout the different views.

DETAILED DESCRIPTION

Wheel casings according to an exemplary embodiment of the disclosure are configured to reduce the wheel aerodynamic drag on the vehicle and thus improve the vehicle's performance. The wheel casings include a tire wall protection surface over the inner or inboard side of the tire and a strake over the front surface of the tire, thereby reducing the impact of oncoming airflow without having a visible impact on the overall aesthetic appearance of the vehicle.

Figure 1:
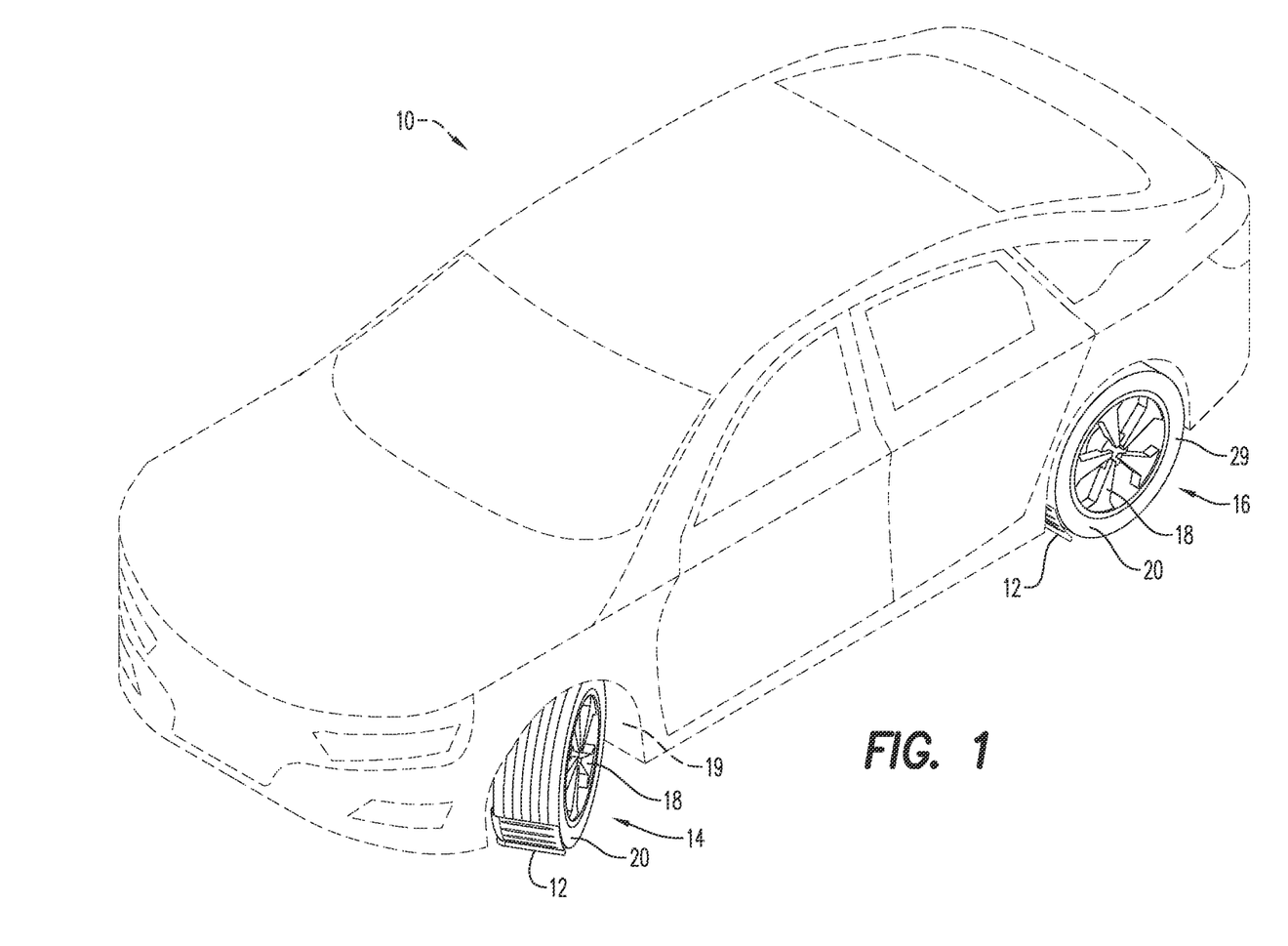
FIG. 1 is a perspective view of a vehicle with the aerodynamic wheel casings according to an exemplary embodiment of the disclosure.
Figure 2:
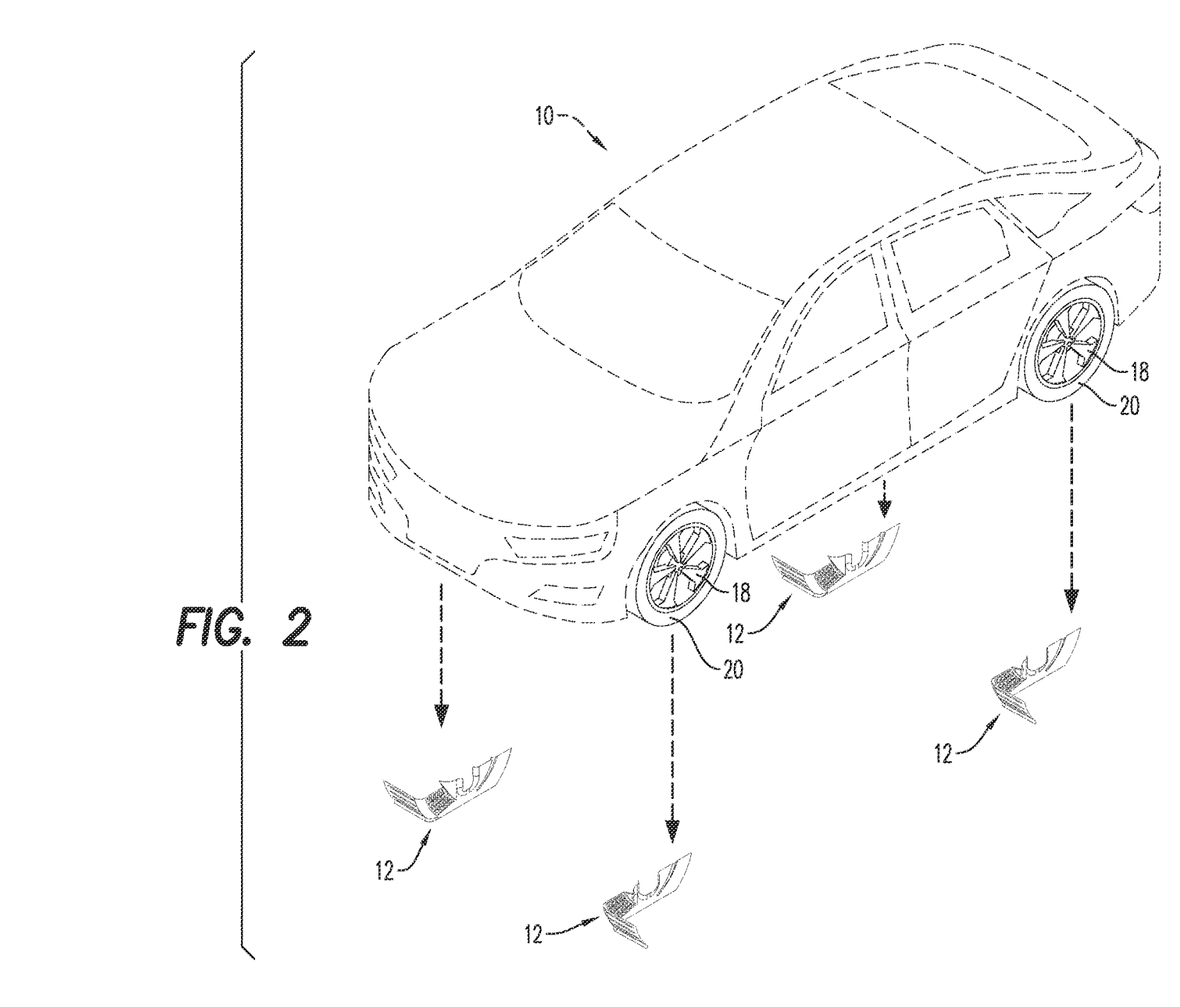
FIG. 2 is an exploded view of the vehicle and wheel casings shown in FIG. 1.

More particularly, a vehicle having reduced aerodynamic drag in accordance with an exemplary embodiment of the disclosure herein is shown generally by reference numeral 10 in FIGS. 1 and 2. In particular, the vehicle 10 includes wheel casings 12 configured for reducing aerodynamic drag across a wheel assembly 14, 16 of the vehicle 10, as set forth in more detail below. The wheel casings 12 also serve to shield the tires 20 from high momentum air flow underneath the vehicle when the vehicle is in motion and from excess air within the wheel housing 19. The vehicle 10 and wheel casings 12 can be used in automotive applications to improve aerodynamic performance and provide improved vehicle fuel economy, without detracting from the visual appearance of the vehicle. As will be appreciated by one skilled in the art, the wheel casings 12 are useful for automotive applications, including a variety of types of vehicles, such as, but not limited to passenger cars, cargo vans, private transportation vehicles and public transportation vehicles, etc.

Vehicle 10 includes a pair of front wheel assemblies 14 and a pair of rear wheel assemblies 16 disposed, respectively, on front and rear axles (not shown) of the vehicle 10. Each wheel assembly 14, 16 is configured for moving the vehicle 10 across a surface, such as a road. That is, the wheel assembly 14 includes a wheel 18 configured for rotation with respect to the vehicle 10 and a rotatable tire 20 disposed on the wheel 18. In operation, the axles are turned by a driveshaft (not shown) which in turn rotates the wheels 18 of the vehicle 10. The wheel 18 may be a front wheel disposed on a front axle (not shown) of the vehicle 10 and forming part of a front wheel assembly 14. The wheel 18 could also be a rear wheel disposed on a rear axle (not shown) of the vehicle 10 and forming part of a rear wheel assembly 16. In the exemplary embodiment of the disclosure, a bottom of the body portion 26 of the casings 12 is positioned to extend along or above the exposed rim of the bottom of the wheel 18. Thus, if the tire 20 should go flat, the casing 12 is not damaged since the rim of the wheel 18 will support the vehicle 10. The wheel casings 12 according to an exemplary embodiment of the disclosure herein may be used for reducing aerodynamic drag across front wheel assemblies 14 and rear wheel assemblies 16, as shown in FIG. 2.

FIGS. 3-6 illustrate an exemplary embodiment of the wheel casing 12 as viewed from an inner or inboard side or surface 28 of the tire 20, i.e., when looking at the wheel casing 12 from a centerline axis underneath the vehicle, rather than from an outer or outboard side or surface 29 of the tire 20. As shown, the wheel casing 12 includes an inner body portion 26 positionable along the inboard side 28 of the tire 20 and an integrated front portion or strake 22 configured to cover only a portion of the front circumferential surface 24 of the tire 20. The body portion 26 defines a tire wall protection face which covers a lower portion (i.e., below the centerline) of the inboard surface 28 of the tire 20. The wheel casing 12 is positioned such that an upper edge 54 of the body portion 26 is disposed approximately at or lower than a horizontal centerline of the tire 20 and the wheel casing 12 covers more than half of the lower portion of the inboard side 28 of the tire 20. In other words, the casing 12 is positioned below the axis of rotation of the tire 20 when the body portion 26 is positioned along the inner side 28 of the tire 20. The body portion 26 may of course be configured to cover more or less of the lower portion of the tire 20 as necessitated by vehicle design. Further, the body portion 26 defines a continuous body portion length 26a positioned beneath the axis of rotation and extending from the rounded front connection edge 30 to the terminal end 70 of the body portion 26 (the terminal end being positioned at or inboard of the outermost side of the tire 20 when installed). Body portion 26 also includes a plurality of drainage and ventilation openings 38, such as the triangular shaped openings shown in the exemplary embodiment of FIG. 3, to assist with the drainage of rainwater, sand and other substances from the wheel assembly 14, 16. This is useful to prevent the same from scratching the tires 20 and to allow excess air within the wheel well or wheel housing 19 to be vented away from the wheel assembly 14, 16 to avoid pressure buildup.

Figure 7:
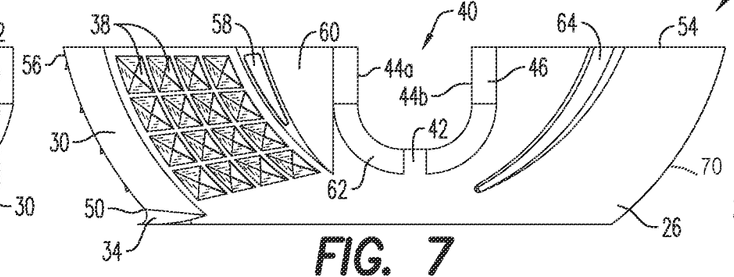
FIG. 7 is a front view of the wheel casing shown in FIG. 3.
Figure 8:
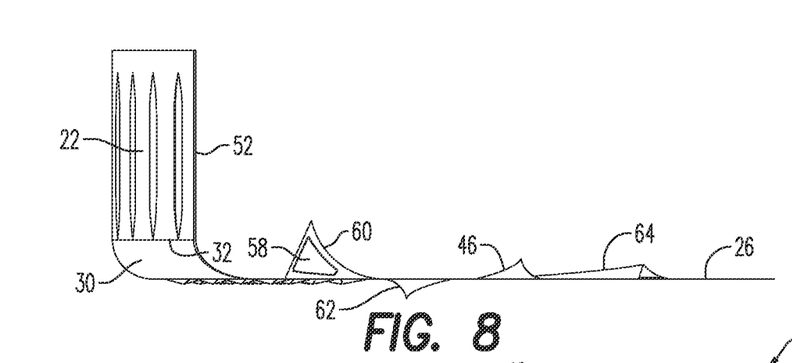
FIG. 8 is a top view of the wheel casing shown in FIG. 3.
Figure 9:
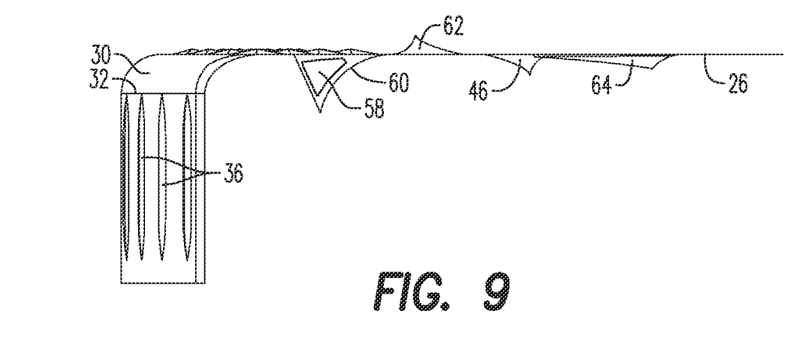
FIG. 9 is a bottom view of the wheel casing shown in FIG. 3.
Figure 10:
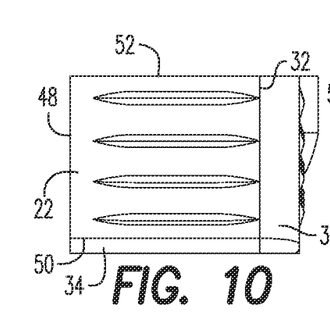
FIG. 10 is a left side view of the wheel casing shown in FIG. 3.
Figure 11:
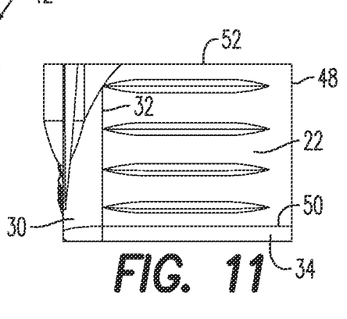
FIG. 11 is a right side view of the wheel casing shown in FIG. 3.

The front portion or strake 22 of the wheel casing covers at least a portion of the tread of the tire 20 when the body portion 26 is positioned along the inboard side 28 of the tire 20. The front strake 22 has a circumferential surface generally conforming to the contour of the tire 20 and having a width "W" extending between an inner or first edge 32 secured to the body portion 26 and an outer or second edge 48 extending outward from the first edge 32 towards the outer or exterior side of the vehicle 10. In the exemplary embodiment, the front strake 22 is also integrally joined to the body portion 26 of the wheel casing 12 by a rounded connecting edge 30 to smoothly direct the flow of air around the wheel casing 12. The width W of the strake 22 is generally equal to or less than the width of the tire 20 such that the strake 22 does not detract from the exterior or aesthetic appearance of the vehicle 12. That is, the strake 22 may have a width between the first edge 32 and the second edge 48 generally corresponding to a width of the tire 20 or the width of the strake 22 may be less than the full width of the tire 20. The circumferential surface of the strake 22 also defines a height or length "L" extending between a lower or leading edge 50 of the circumferential surface and the upper or trailing edge 52 thereof (relative to forward rotation of the tire 20). By way of non-limiting example, the front strake 22 may extend approximately 180-225 degrees circumferentially about the tire 20, depending upon the particular vehicle design and as needed to provide the desired reduction of drag forces. The length L of the strake 22 is of course limited by the necessity of the tire 20 to still contact the road surface when the vehicle 10 is being driven without interference from the wheel casing 12. Due to the curvature of the strake 22 and positioning of the wheel casing 12 along the lower portion of the tire 20 below the axis of rotation, the leading edge 50 is disposed rearward of a forward-most part 56 of the strake 22 (as shown best in FIG. 7).

Figure 3:
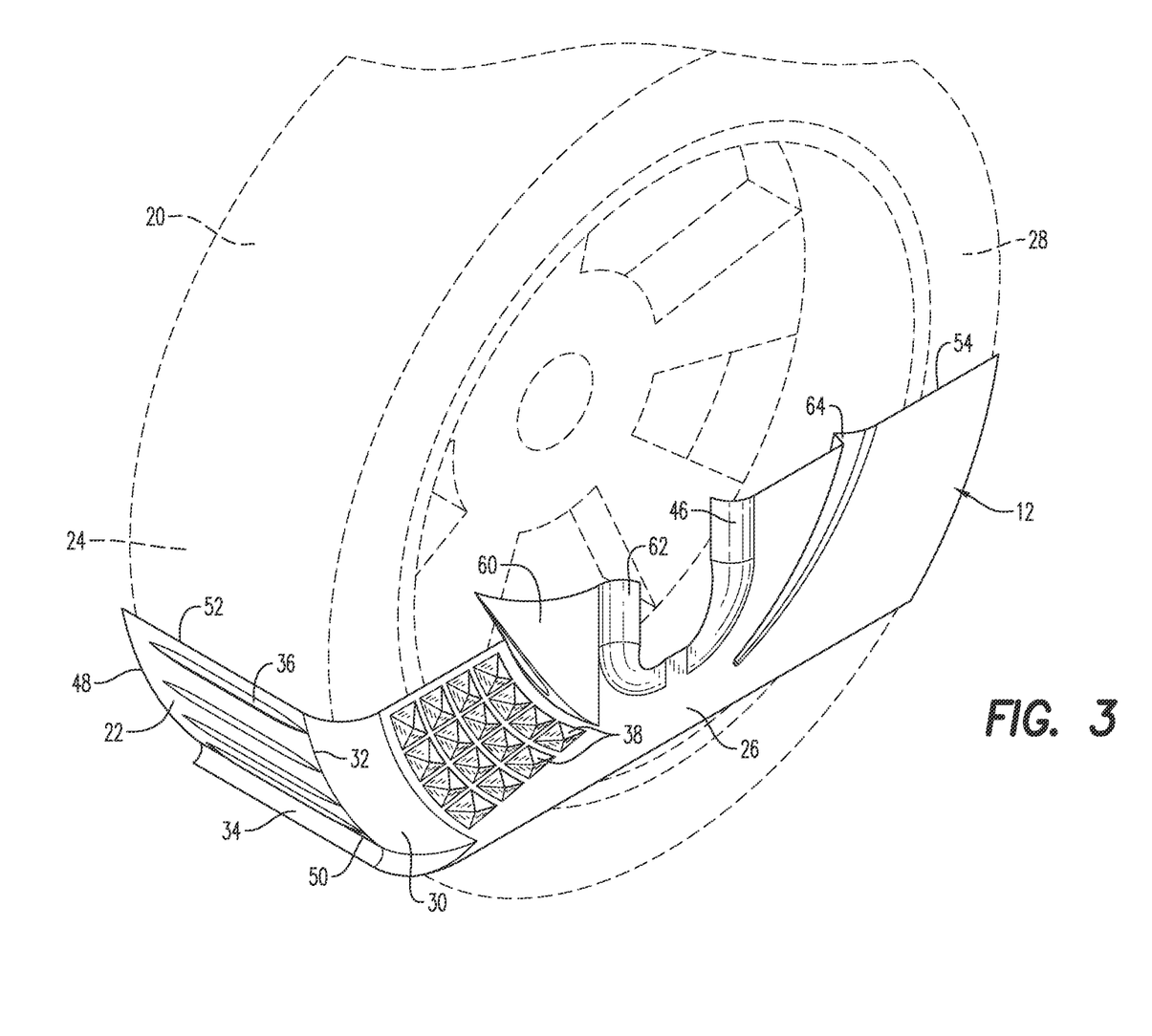
FIG. 3 is an outer, front, top perspective view of a wheel casing for a wheel according to an exemplary embodiment of the disclosure.
Figure 4:
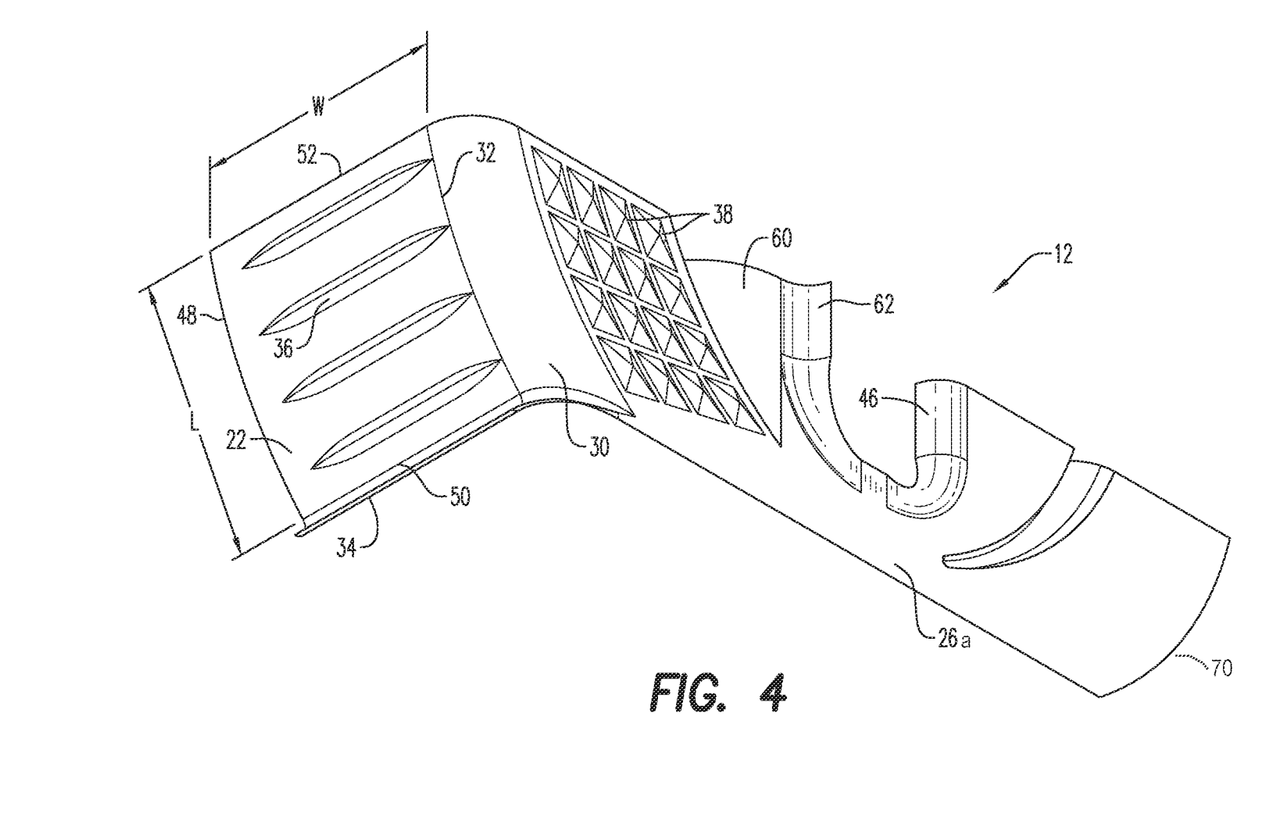
FIG. 4 is an outer, front, bottom perspective view of the wheel casing shown in FIG. 3.
Figure 5:
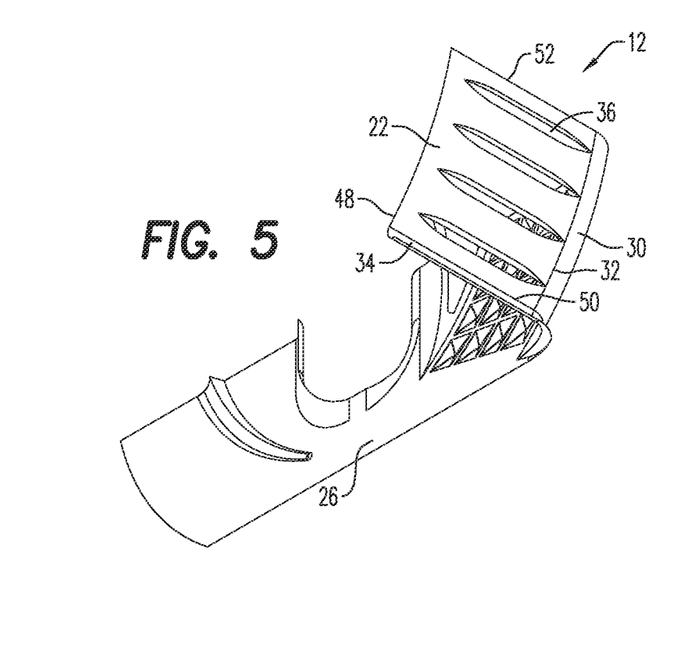
FIG. 5 is an inner, front, bottom perspective view of the wheel casing shown in FIG. 3.
Figure 6:
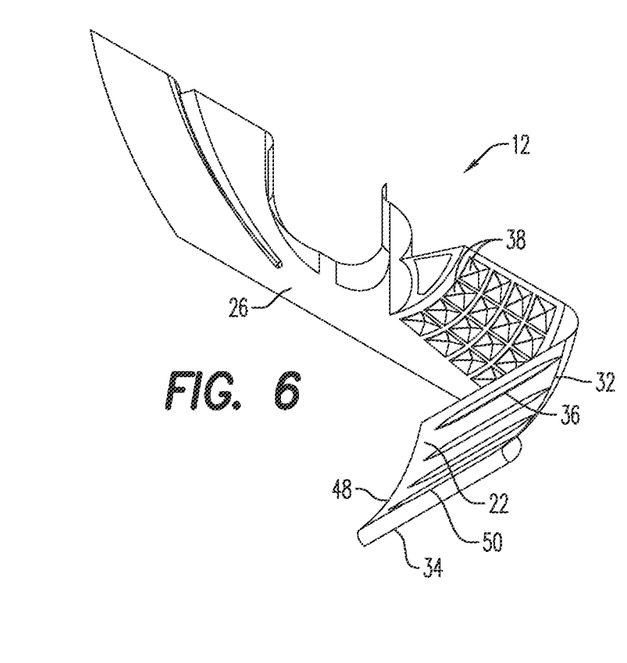
FIG. 6 is an inner, front, top perspective view of the wheel casing shown in FIG. 3.

As shown best in FIGS. 3 and 6, extending forward and away from the lower or leading edge 50 of the strake 22 is a front lip or kick 34. The kick 34 is essentially a two-dimensional protrusion, or three-dimensional depending on vehicle requirements, having only a nominal thickness. While the front strake 22 is curved to generally follow the circumferential curve of the tire 20, the front kick 34 extends away from the front strake 22 at an angle of, by way of non-limiting example, approximately 20-160 degrees relative to a line tangent to the strake 22, and in particular, the front kick 34 is disposed at an angle of approximately 90 degrees relative to the tangent line of the strake 22. The front kick 34 projects forward from the leading edge 50 but is also disposed rearward of a forward-most part 56 of the strake 22 (shown best in FIG. 7). In the exemplary embodiment, the kick 34 has a width generally corresponding to that of the strake 22 in that it extends along the leading edge 50 of the strake 22 from the first edge 32 of the strake 22 to the second edge 48 of the strake 22. However, the kick 34 may also have a width less than the width of the strake 22 and the overall casing 12. The kick 34 curves around below the rounded front connection edge 30 and gradually blends with the body portion 26 of the wheel casing 12. The kick 34 is beneficial in creating increased downforce on the wheel casing assembly 14, 16 to thereby counteract the lifting force generated by the oncoming airflow when the vehicle 10 is in forward motion, especially at higher speeds.

The front strake 22 may also include at least one drainage vent or opening 36, although not required, which assists with ventilation around the tire 20 and in the drainage of rainwater and other substances, such as sand, small rocks, gravel, snow and the like, away from the vehicle 10. Generally speaking, in the exemplary embodiment of the disclosure, a plurality of openings 36 have a minimum width of at least 5-10 mm and may extend up to almost the entire width of the strake 22, taking into consideration the margin necessary to maintain the structural integrity of the strake 22.

Referring also to FIGS. 7-11, the body portion 26 of the wheel casing 12 further includes an axle opening or recess 40 shaped to receive a suspension component during operation of the vehicle and, more particularly, to accommodate movement of the wheel axle (not shown), either forward or rearward, depending upon the location of the casing 12. In an exemplary embodiment of the disclosure, axle opening 40 has an upwardly facing open end and is defined by a generally semi-circular bottom 42 and generally vertical extending sides 44a, 44b which form a U-shaped opening. A large radiused edge 46 is disposed rearward of the axle opening 40 in order to better accommodate movement of the wheel axle and serve as an air deflector. More particularly, the radiused edge 46 will smoothly guide the air passing downstream of the opening 40 and allow it to pass rearwardly out of the wheel casing 12. In addition to the drainage and ventilation openings 38 discussed above, the body portion 26 of the exemplary embodiment also includes a larger drainage and ventilation opening 58 having, for example, a generally triangular shape, which allows for excess air flow within the wheel casing to exit to the exterior of the vehicle. The wall 60 rearward of the opening 58 defines a curved surface provided with a large radius of curvature so as to reduce the negative aerodynamic impact of any incoming airflow through the opening 58. The wall 60 also has an outwardly projecting surface in order to minimize the clearance of the wheel casing 12 with the tire 20, i.e., projects towards the tire to minimize the air volume or air gap by creating a closer arrangement with the tire 20. Forward of the axle opening 40 is a side kick 62 to prohibit the flow of air from entering the axle opening 40. The kick 62 serves to protect the knuckle by deflecting airflow towards the centerline away of the vehicle rather than allowing it to enter the wheel casing 12. Rearward of the axle opening 40, the body portion 26 includes an inward groove 64 that also serves to minimize the clearance of the wheel casing 12 with the tire 20, i.e., minimize the air volume or air gap by creating a closer arrangement with the tire 20. The forwardmost edge of the groove 64 forms a sharp edge in order to provide for a separation of flow at a sharp angle, and the rearwardmost edge of the groove 64 has a rounded edge in order to maximize the curvature and smoothly deflect the airflow rearward.

Figure 12:
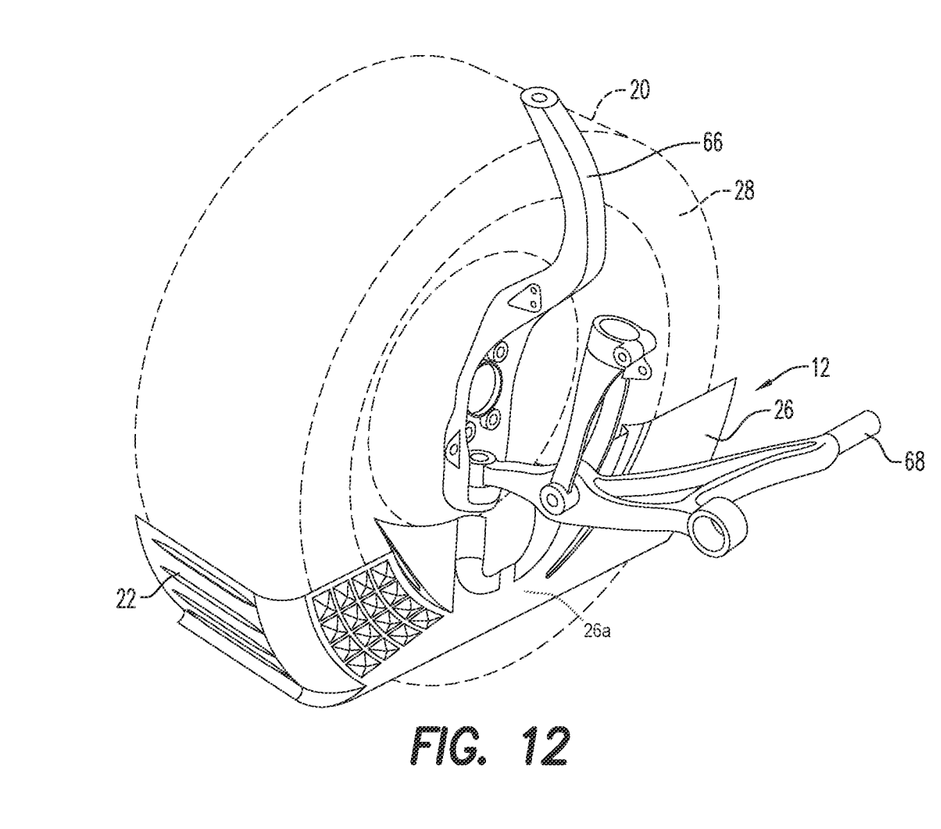
FIG. 12 is a further outer, front, top perspective view of the wheel casing shown in FIG. 3.

With reference also to FIG. 12, the wheel casings 12 can be mounted in a multitude of ways including, by way of non-limiting example, attachment to the wheel knuckle 66, the lower arm 68, or as an extension of brake shields (not shown) of the vehicle 10. Alternatively, the wheel casings 12 may be attached to any other location as needed. The attachment locations are not limited to those mentioned above, and any mechanisms of attachment could be used if it successfully places the wheel casings in the proper location for use. The wheel assembly 14, 15 is made by installing and attaching the wheel casings 12 from the bottom or lower surface. Hence, referring also to FIG. 4, the body portion 26 defines a continuous body portion length 26a positioned beneath the axis of rotation and extending from a first end positioned along the inboard surface of the tire forward of the axis of rotation proximal the rounded front connection edge 30 to a second end positioned along the inboard surface of the tire rearward of the axis of rotation, i.e., terminal end 70 of the body portion 26.

As one skilled in the art will appreciate, an exemplary embodiment of the wheel casing 12 according to the disclosure herein seeks to minimize the clearance between the wheel casing 12 and the wheel assembly 14, 16 so as to reduce the volume of air and thus the likelihood of airflow directly contacting the wheel assembly 14, 16. More particularly, the wheel casing 12 minimizes the effect of airflow coming from underneath the vehicle and contacting the wheel during forward motion. In addition, the wheel casing 12 minimizes the effect of airflow already within the wheelhouse since the wheel casing 12 serves as a physical barrier between the wheelhouse and the wheel assembly 14, 16.

While various embodiments of the disclosure have been described, the description is intended to be exemplary, rather than limiting and it will be apparent to those of ordinary skill in the art that many more embodiments and implementations are possible that are within the scope of the disclosure. Accordingly, the disclosure is not to be restricted except in light of the attached claims and their equivalents. Also, various modifications and changes may be made within the scope of the attached claims.

We claim:

1. A wheel assembly for a vehicle comprising:
a wheel configured for rotation with respect to the vehicle and a tire configured to be mounted on the wheel, the tire having an inboard surface, an outboard surface, and a circumferential tread surface extending between the inboard surface and the outboard surface; and
a wheel casing configured to be positioned beneath an axis of rotation of the wheel such that the wheel casing defines a body portion including a continuous length positioned beneath the axis of rotation, along the inboard surface of the tire, and extending between a first end disposed on one side of the axis of rotation to a second free terminal end disposed on an opposing side of the axis of rotation;
wherein the body portion includes an axle opening therethrough defined by at least a bottom surface, a front opening surface disposed forward of the axle opening and a rear opening surface disposed rearward of the axle opening, the rear opening surface having a larger radius of curvature than the front opening surface.

2. A wheel assembly for a vehicle comprising:
a wheel configured for rotation with respect to the vehicle and a tire configured to be mounted on the wheel, the tire having an inboard surface, an outboard surface, and a circumferential tread surface extending between the inboard surface and the outboard surface; and
a wheel casing configured to be positioned beneath an axis of rotation of the wheel such that the wheel casing defines a body portion including a continuous length positioned beneath the axis of rotation, along the inboard surface of the tire, and extending between a first end disposed on one side of the axis of rotation to a second free terminal end disposed on an opposing side of the axis of rotation;

wherein the wheel casing further comprises a strake portion configured to cover only a portion of a front circumferential tread surface of the tire.

3. The wheel assembly according to claim 2, wherein the strake portion and the body portion of the wheel casing are integrally formed.

4. The wheel assembly according to claim 3, wherein the strake portion and the body portion are joined by a rounded front connection edge.

5. The wheel assembly according to claim 2, wherein the strake portion includes at least one opening configured for ventilation and drainage.

6. The wheel assembly according to claim 5, wherein the body portion includes at least one opening for ventilation and drainage.

7. The wheel assembly according to claim 2, wherein the strake portion includes a curvature generally corresponding to a curvature of the front circumferential surface of the tire.

8. The wheel assembly according to claim 2, wherein the strake portion includes a front kick extending forwardly from a lower edge of the strake portion.

9. A wheel casing comprising:
a body portion configured to be positioned along an inboard sidewall of a tire having an axis of rotation;
at least a front strake positionable over tread of the tire, the front strake comprising a first edge adjacent the body portion and extending outwardly to a second edge of the front strake that terminates at or inboard of an outboard side of the tire, the front strake defining a lower edge and an upper edge; and
a front kick extending forwardly from the lower edge of the front strake;
wherein the lower edge and the upper edge are both positioned forward of the axis of rotation, and wherein tread of the tire positioned rearward of the upper edge is uncovered by the wheel casing.

10. The wheel casing according to claim 9, wherein the lower edge of the front strake is positionable forward of and below an axis of rotation of the tire when the body portion is positioned along the inboard sidewall of the tire, and rearward of a forwardmost surface of the front strake.

11. The wheel casing according to claim 10, wherein the front strake has a curvature generally corresponding to a curvature of a front circumferential surface of the tire.

12. The wheel casing according to claim 9, wherein an entirety of the front kick is positioned rearward of a forwardmost surface of the front strake.

13. A wheel casing comprising:
a body including a continuous length positionable beneath an axis of rotation of a wheel assembly including a tire, the continuous length extending from a first end positioned along an inboard surface of the tire forward of the axis of rotation to a second end positioned along the inboard surface of the tire rearward of the axis of rotation; and
a forward strake portion extending from the first end of the body, the forward strake portion extending radially outwardly from the first end of the body to cover at least a portion of a circumferential tread surface of the tire and terminating at or before an outboard surface of the tire;
wherein a portion of the body positioned between the first and second ends is shaped to receive a suspension component during operation of the vehicle.

14. The wheel casing according to claim 13, wherein the forward strake portion includes at least one ventilation opening.

15. The wheel casing according to claim 13, wherein the portion of the body positioned between the first end and the second end includes a recess having an upwardly facing open edge configured to receive the suspension component during operation of the vehicle.

16. The wheel casing according to claim 15, wherein the recess includes a semi-circular bottom and vertical extending sides which define a U-shaped opening configured to receive the suspension component during operation of the vehicle.

17. The wheel casing according to claim 13, wherein the body further includes at least one outwardly projecting portion configured to minimize clearance with the inboard surface of the tire and thereby reduce an air gap between the tire and the wheel casing.

18. The wheel casing according to claim 13, further comprising a front kick extending from a lower edge of the forward strake portion.

19. The wheel casing according to claim 13, wherein the continuous length of the body extends from the first end to a free terminal end of the second end.

* * * * *